United States Patent [19]

Green et al.

[11] Patent Number: 5,994,479
[45] Date of Patent: *Nov. 30, 1999

[54] CURABLE COATING COMPOSITIONS CONTAINING BLENDS OF CARBAMATE-FUNCTIONAL COMPOUNDS

[75] Inventors: Marvin L. Green, Brighton; John D. McGee; Brian D. Bammel, both of Highland, all of Mich.; Danielle A. Regulski, Charleston, S.C.; Walter H. Ohrbom, Hartland Township, Mich.

[73] Assignee: BASF Corporation, Southfield, Mich.

[*] Notice: This patent is subject to a terminal disclaimer.

[21] Appl. No.: 08/997,317

[22] Filed: Dec. 23, 1997

Related U.S. Application Data

[63] Continuation-in-part of application No. 08/176,608, Jan. 3, 1994, abandoned, application No. 08/287,351, Aug. 8, 1994, abandoned, which is a continuation-in-part of application No. 08/098,177, Jul. 28, 1993, abandoned, application No. 08/333,804, Nov. 3, 1994, application No. 08/333,917, Nov. 3, 1994, Pat. No. 5,744,550, application No. 08/513,587, Aug. 10, 1995, Pat. No. 5,726,244, application No. 08/547, 174, Oct. 24, 1995, Pat. No. 5,723,552, which is a division of application No. 08/361,344, Dec. 21, 1994, abandoned, application No. 08/547,513, Oct. 24, 1995, Pat. No. 5,726, 274, which is a division of application No. 08/361,344, Dec. 21, 1994, abandoned, application No. 08/667,261, Jun. 20, 1996, Pat. No. 5,777,048, application No. 08/673,935, Jul. 1, 1996, Pat. No. 5,852,136, application No. 08/698,522, Aug. 15, 1996, which is a continuation of application No. 08/540, 277, Oct. 6, 1995, abandoned, application No. 08/698,523, Aug. 15, 1996, Pat. No. 5,770,650, which is a continuation of application No. 08/540,279, Oct. 6, 1995, abandoned, application No. 08/698,524, Aug. 15, 1996, Pat. No. 5,792, 810, which is a continuation of application No. 08/550,880, Oct. 6, 1995, abandoned, application No. 08/698,526, Aug. 15, 1996, Pat. No. 5,760,127, which is a continuation of application No. 08/686,929, Oct. 6, 1995, application No. 08/698,528, Aug. 15, 1996, Pat. No. 5,756,213, which is a continuation of application No. 08/540,275, Oct. 6, 1995, abandoned, application No. 08/698,529, Aug. 15, 1996, Pat. No. 5,854,385, which is a continuation of application No. 08/540,274, Oct. 6, 1995, abandoned, application No. 08/831,810, Apr. 2, 1997, application No. 08/867,547, Jun. 2, 1997, which is a continuation of application No. 08/513, 587, Aug. 10, 1995, Pat. No. 5,726,244, application No. 08/886,321, Jul. 1, 1997, Pat. No. 5,872,195

[60] Provisional application No. 60/021,068, Jul. 1, 1996.

[51] Int. Cl.[6] .............................. C08G 8/28; C08G 59/14; C08L 63/00; C08L 67/04

[52] U.S. Cl. .................... 525/481; 525/488; 525/510; 525/514; 525/528; 525/129; 525/144; 525/146; 525/163; 428/423.1

[58] Field of Search .................... 524/590, 539, 524/591, 598; 525/509, 519, 414, 415, 450, 481, 488, 510, 514, 528; 428/423.1; 528/129, 144, 146, 163

[56] References Cited

U.S. PATENT DOCUMENTS

| | | | |
|---|---|---|---|
| 5,726,244 | 3/1998 | McGee et al. | 525/78 |
| 5,756,213 | 5/1998 | Ohrbom et al. | 428/412 |
| 5,760,127 | 6/1998 | Bammel et al. | 524/590 |
| 5,770,650 | 6/1998 | McGee et al. | 524/590 |
| 5,792,810 | 8/1998 | Menovcik et al. | 524/590 |
| 5,872,195 | 2/1999 | Green et al. | |

OTHER PUBLICATIONS

Claims "1–24" of the U.S. application No. 08/886321.

*Primary Examiner*—Duc Truong
*Attorney, Agent, or Firm*—Anne Gerry Sabourin

[57] ABSTRACT

The present invention provides a curable coating composition comprising (a) a first component comprising at least two functional groups, at least one of which is a carbamate or urea group that is the reaction product of:
  (1) a hydroxyl group that is the result of a ring-opening reaction between an epoxy group and an organic acid group, and
  (2) cyanic acid or a carbamate or urea group;

(b) a curing agent having a plurality of functional groups that are reactive with component (a), and (c) a second component having functional groups that are reactive with component (a) or component (b) or both components (a) and (b).

42 Claims, No Drawings

CURABLE COATING COMPOSITIONS CONTAINING BLENDS OF CARBAMATE-FUNCTIONAL COMPOUNDS

This is a continuation-in-part of each of the following applications: application Ser. No. 08/176,608, filed Jan. 3, 1994, now abandoned; application Ser. No. 08/287,351, filed Aug. 8, 1994, now abandoned which is a continuation-in-part of Ser. No. 08/098,177, filed Jul. 28, 1993, now abandoned; application Ser. No. 08/333,804, filed Nov. 3, 1994; application Ser. No. 08/333,917, filed Nov. 3, 1994, now U.S. Pat. No. 5,744,550, issued Apr. 28, 1998; application Ser. No. 08/513,587, filed Aug. 10, 1995, now U.S. Pat. No. 5,726,244, issued Mar. 10, 1998; application Ser. No. 08/547,174, filed Oct. 24, 1995, now U.S. Pat. No. 5,723,552, issued Mar. 3, 1998, which is a divisional of Ser. No. 08/361,344, filed Dec. 21, 1994, now abandoned; application Ser. No. 08/547,513, filed Oct. 24, 1995, now U.S. Pat. No. 5,726,274, issued Mar. 10, 1998, which is a divisional of Ser. No. 08/361,344, filed Dec. 21, 1994, now abandoned; application Ser. No. 08/667,261, filed Jun. 20, 1996, now U.S. Pat. No. 5,777,048, issued Jul. 7, 1998; application Ser. No. 08/673,935, filed Jul. 1, 1996; now U.S. Pat. No. 5,852,136, application Ser. No. 08/698,522, filed Aug. 15, 1996, which is a continuation of Ser. No. 08/540,277, filed Oct. 6, 1995, now abandoned; application Ser. No. 08/698,523, filed Aug. 15, 1996, now U.S. Pat. No. 5,770,650, issued Jun. 23, 1998, which is a continuation of Ser. No. 08/540,279, filed Oct. 6, 1995, now abandoned; application Ser. No. 08/698,524, filed Aug. 15, 1996, now U.S. Pat. No. 5,792,810, issued Aug. 11, 1998, which is a continuation of Ser. No. 08/550,880, filed Oct. 6, 1995, now abandoned; application Ser. No. 08/698,526, filed Aug. 15, 1996, now U.S. Pat. No. 5,760,127, issued Jun. 2, 1998, which is a continuation of Ser. No. 08/686,929, filed Oct. 6, 1995; application Ser. No. 08/698,528, filed Aug. 15, 1996, now U.S. Pat. No. 5,756,213, issued May 26, 1998, which is a continuation of Ser. No. 08/540,275, filed Oct. 6, 1995, now abandoned; application Ser. No. 08/598,529, filed Aug. 15, 1996, now U.S. Pat. No. 5,854,385, which is a continuation of Ser. No. 08/540,274, filed Oct. 6, 1995, now abandoned; application Ser. No. 08/831,810, filed Apr. 2, 1997; application Ser. No. 08/867,547, filed Jun. 2, 1997, which is a continuation of Ser. No. 08/513,587, filed Aug. 10, 1995, now U.S. Pat. No. 5,726,244, issued Mar. 10 1998; application Ser. No. 08/886,321, filed Jul. 1, 1997, now U.S. Pat. No. 5,872,195, which is a continuation of provisional application Ser. No. 60/021,068, filed Jul. 1, 1996.

FIELD OF THE INVENTION

This invention concerns curable coating compositions, especially compositions for high-gloss topcoats, particularly for clearcoats of color-plus-clear composite coatings.

BACKGROUND OF THE INVENTION

Curable, or thermosettable, coating compositions are widely used in the coatings art, particularly for topcoats in the automotive and industrial coatings industry. Color-plus-clear composite coatings are particularly useful as topcoats for which exceptional gloss, depth of color, distinctness of image, or special metallic effects are desired. The automotive industry has made extensive use of these coatings for automotive body panels.

Single-layer topcoats and the clearcoats of color-plus-clear composite coatings, however, require an extremely high degree of clarity and gloss to achieve the desired visual effect. Such coatings also require a low degree of visual aberrations at the surface of the coating in order to achieve the desired visual effect such as high distinctness of image (DOI). As such, these coatings are especially susceptible to a phenomenon known as environmental etch. Environmental etch manifests itself as spots or marks on or in the finish of the coating that often cannot be rubbed out. It is often difficult to predict the degree of resistance to environmental etch that a high gloss topcoat or color-plus-clear composite coating will exhibit. Many coating compositions known for their durability and/or weatherability when used in exterior paints, such as known high-solids enamels, do not provide the desired level of resistance to environmental etch when used in high gloss coatings such as the clearcoat of a color-plus-clear composite coating.

Various compositions have been proposed to meet the above requirements for use as the topcoat coating or as the clearcoat of a color-plus-clear composite coating, including polyurethanes, acid-epoxy systems and the like. However, many prior art systems suffer from disadvantages such as coatability problems, marginal compatibility with the pigmented basecoat, solubility problems, and marginal appearance. Moreover, while one-pack compositions are preferred to two-pack compositions (in which the reactive component must be separated before application to prevent premature reaction), very few one-pack coating compositions have been found that provide satisfactory resistance to environmental etch, especially in the demanding environment of automotive coatings.

There is also a continuing desire to reduce the volatile organic content (VOC) of coating compositions. Previous low-VOC coating compositions generally have had less environmental etch resistance. Reducing the VOC must be done without sacrificing the rheological properties of the coating composition required for trouble-free application of the composition while maintaining the desired level of appearance. In addition, it is desirable to provide coatings with a good combination of properties such as durability, hardness, flexibility, and resistance to scratching, marring, solvents, and acids.

Curable coating compositions utilizing carbamate-functional resins are described, for example, in U.S. Pat. Nos. 5,693,724, 5,693,723, 5,639,828, 5,512,639, 5,508,379, 5,451,656, 5,356,669, 5,336,566, and 5,532,061, and U.S. application Ser. Nos. 08/886,321, filed Jul. 1, 1997, 08/698,529, filed Aug. 15, 1996, 08/719,670, filed Sep. 25, 1996, 08/166,277, filed Dec. 13, 1993, 08/339,999, filed Nov. 15, 1994, 08/333,917, filed Nov. 3, 1994, 08/176,608, filed Jan. 3, 1994, 08/287,351, filed Aug. 8, 1994, 08/804, 239, filed Feb. 20, 1997, 08/333,804, filed Nov. 3, 1994, 08/884,613, filed Jun. 30, 1997, 08/885,638, filed Jun. 30, 1997, 08/513,587, filed Aug. 10, 1995, 08/867,547, filed Jun. 2, 1997, 08/547,514, filed Oct. 24, 1994, 08/547,513, filed Oct. 24, 1994, 08/547,174, filed Oct. 24, 1994, 08/698, 524, filed Aug. 15, 1996, 08/698,526, filed Aug. 15, 1996, 08/667,261, filed Jun. 20, 1996, 08/698,528, filed Aug. 15, 1996, 08/698,522, filed Aug. 15, 1996, 08/698,572, filed Aug. 15, 1996, 08/698,523, filed Aug. 15, 1996, 08/673,935, filed Jul. 1, 1996, 08/886,321, filed Jul. 1, 1997, and 08/831, 810, filed Apr. 2, 1997, each of which is incorporated herein by reference. These coating compositions can provide significant etch advantages over other coating compositions, such as hydroxy-functional acrylic/melamine coating compositions. It may often be desirable, however, to provide still further improvements in the above-described coating properties. In particular, it has been discovered that coating compositions having improved properties are obtained by blending carbamate- or urea-functional resins with resins having carbamate, urea, and/or different functionalities or bringing different properties to the cured coating formed from the combination. The blends of the present invention provide coatings that have improved environmental etch resistance and improved exterior durability (weathering or exposure durability), as well as lower volatile organic content (VOC).

SUMMARY OF THE INVENTION

The present invention provides a curable coating composition comprising
(a) a first component comprising at least two functional groups on average per molecule, at least one of which is a carbamate or urea group that is the reaction product of:
(1) a hydroxyl group that is the result of a ring-opening reaction between an epoxy group and an organic acid group, and
(2) cyanic acid or a carbamate or urea group;
(b) a curing agent having a plurality of functional groups that are reactive with component (a), and
(c) a second component having functional groups that are reactive with component (a) or component (b) or both components (a) and (b).

DETAILED DESCRIPTION

The composition according to the present invention includes (a) a first component with at least two functional groups on average per molecule, preferably at least two functional groups per molecule, at least one of which is a carbamate or urea group, preferably a carbamate group; (b) a curing agent having, on average per molecule, a plurality of functional groups reactive toward the first component; and (c) a second component having groups reactive with either the first component or the curing agent or both. Preferably, the second component has two or more functional groups on average per molecule that are reactive toward component (a) and/or curing agent (b).

The first component has at least two functional groups on average per molecule, at least one of which is a carbamate or urea group that is the reaction product of a hydroxyl group and cyanic acid or a compound comprising a carbamate or urea group. Preferably, the first component has at least one carbamate group that is the reaction product of a hydroxyl group and cyanic acid or a compound comprising a carbamate group. The hydroxyl group used to form this reaction product is itself formed by a reaction between an epoxy group and an organic acid.

The hydroxy group-containing precursor of the first component can be prepared in a variety of ways. Organic acids react with epoxide groups to form β-hydroxy ester groups. This reaction often utilizes carboxylic acid groups, although other organic acids such as phenolic compounds may be used as well. The acid/epoxy reaction may proceed spontaneously at ambient conditions, either in solvent or neat, or may be advantageously accelerated with heat and/or catalysts, such as amine catalysts. Examples of possible synthetic routes include reacting a monoepoxide with a monoacid, reacting a monoepoxide with a hydroxy acid, reacting a monoepoxide with a polyacid, reacting a polyepoxide with a monoacid, reacting a polyepoxide with a hydroxy acid, and reacting a polyepoxide with a polyacid. In a preferred embodiment, a hydroxy acid or a polyacid or a mixture of these is reacted with a monoepoxide. As used herein, the term "monoepoxide" refers to a compound having one epoxide, or oxirane, functional group. The term "polyepoxide" refers to a compound having a plurality of epoxide functional groups. The term "monoacid" refers to a compound having one acid functional group. The term "polyacid" refers to a compound having a plurality of acid functional groups. The term "hydroxy acid" refers to a compound that has at least one acid functional group and at least one hydroxyl functional group.

Epoxides useful in the practice of the present invention may be characterized generally by the structure:

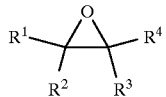

in which $R^1$, $R^2$, $R^3$, and $R^4$ are each independently H (with the proviso that at least one of $R^1$–$R^4$ is other than H), an organic radical, which may be polymeric or non-polymeric and may contain unsaturation and/or heteroatoms, or one of $R^1$ or $R^2$ together with one of $R^3$ or $R^4$ may form a cyclic ring, which may contain unsaturation and/or heteroatoms.

Useful epoxides may be prepared by various means, such as by reacting alcohols or acids with an epihalohydrin compound (e.g., epichlorohydrin) to form the corresponding glycidyl ether or glycidyl ester. Alcohol- and acid-containing compounds useful in forming such glycidyl ethers or glycidyl esters include, for example and without limitation, butanol, neopentyl glycol, trimethylolpropane, bisphenol A, and neoalkanoic acids such as neodecanoic acid. In another example, useful epoxides may be prepared by reaction of a carbon-carbon double bond with peroxide.

The epoxide may be monofunctional or polyfunctional, which can be controlled by selection of the starting material. For example, a monoepoxide can be prepared by reacting a mono-alcohol or a mono-acid with an epihalohydrin or a mono-unsaturate with peroxide, and a polyepoxide can be prepared by reacting a polyol (including diols, triols, and higher-functionality polyols) or a polyacid with an epihalohydrin or a polyunsaturate compound with peroxide. Oligomeric or polymeric polyepoxides, such as acrylic resins polymerized from monomers including glycidyl methacrylate or epoxy-terminated polyglycidyl ethers such as the diglycidyl ether of bisphenol A (DGEBPA) and the epoxide-terminated oligomers of DGEBPA with polyphenols such as bisphenol A or with polyamines such as ethylene diamine or diethylene triamine, can also be used. Epoxidized polyurethane resins or polyester resins can be prepared by reacting OH group-containing polyurethanes or polyesters with an epihalohydrin or by epoxidizing unsaturated groups of the polyester or polyurethane as described above. Epoxides can also be prepared by reacting an isocyanate-terminated component such as a monomeric polyisocyanate (including isocyanurates, e.g., the isocyanurate of isophorone diisocyanate) or an isocyanate-functional polymer or oligomer with glycidol. Other known polyepoxides, e.g., epoxy-novolac resins, may also be used.

In one preferred embodiment, the epoxide is a monoepoxide, preferably a glycidyl ester. Glycidyl esters can be prepared by reacting a monofunctional carboxylic acid, for example and without limitation alkanoic acids such as octanoic acid, benzoic acid, benzylic acid, cyclohexane carboxylic acid, and neoalkanoic acids such as neodecanoic acid, with an epihalohydrin (e.g., epichlorohydrin) under conditions well-known in the art. The glycidyl ester of a neoalkanoic acid or mixture of neoalkanoic acids is particularly preferred. Glycidyl esters are commercially available, for example under the tradename Cardura® E from Shell Oil Company, under the tradename Glydexx® N-10 from Exxon, or under the tradename Araldite® PT910 from Ciba-Geigy. Glycidyl esters may in general be represented by the formula:

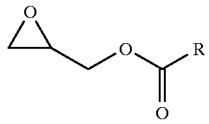

wherein R is a hydrocarbon group of from 1 to 40 carbon atoms, preferably 1–20 carbon atoms, and most preferably 1–12 carbon atoms. This hydrocarbon group may be branched or may be substituted. Polyglycidyl esters may also be used, and can be prepared by reacting a polyfunctional carboxylic acid, such as, without limitation, phthalic acid, thioglycolic acid, or adipic acid, with an epihalohydrin. Polyglycidyl esters can also be described by the above formula when R is substituted with other glycidyl ester groups. oligomeric or polymeric polyglycidyl esters may be formed by reaction of an oligomer or polymer that has two or more carboxylic acid groups with an epihalohydrin. Examples of suitable oligomeric or polymeric polyacids include, without limitation, polyesters having terminal acid groups and acrylic resins that are copolymers of acrylic and/or methacrylic acid. Oligomeric or polymeric polyglycidyl esters may also be formed by polymerization of a monomer having at least one glycidyl ester. For example, and without limitation, such materials may be produced by addition polymerization of a monomer mixture that includes, for example and without limitation, glycidyl acrylate or glycidyl methacrylate to produce a glycidyl ester-functional acrylic resin or by a step-wise or condensation polymerization of a monomer such as the glycidyl ester of dimethylolpropionic acid to produce, for example, an epoxide functional polyester or polyurethane.

Another useful class of monoepoxides are glycidyl ethers. Glycidyl ethers can be prepared by the reaction of monofunctional alcohols such as, for example and without limitation, n-butanol, propanol, 2-ethylhexanol, dodecanol, phenol, cresol, cyclohexanol, and benzyl alcohol, with an epihalohydrin such as epichlorohydrin. Useful glycidyl ethers include the glycidyl ether of 2-ethylhexanol, the glycidyl ether of dodecanol, the glycidyl ether of phenol, and the like. These compounds are commercially available under the tradename Erisys® from CVC Specialties. Polyglycidyl ethers may also be used, and can be prepared by reacting a polyfunctional alcohol such as, without limitation, bisphenol F, bisphenol A, or 1,6-hexanediol with an epihalohydrin. While phenolic hydroxyls are generally regarded as acidic, the product of the reaction is a glycidyl ether as opposed to a glycidyl ester.

Epoxides may also be prepared by reacting a compound containing one or more double bonds with peroxide or peracetic acid under conditions well-known in the art. Virtually any double bond-containing compound may be used. Desirable epoxide-functional materials include cycloaliphatic polyepoxide compounds such as

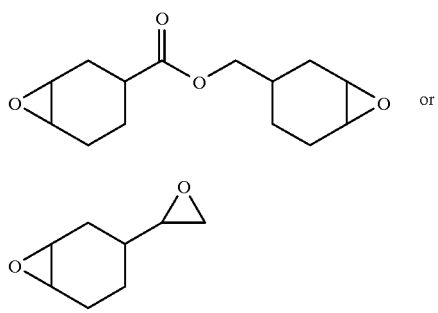

which are available under the tradename Cyracure® from Union Carbide. Other double bond-containing compounds that may be used to produce epoxides useful in the practice of the invention include ethylene, propylene, styrene, styrene oxide, cyclohexene, polybutadiene, and the like and derivatives of these.

The epoxide may also be oligomeric or polymeric, for example, an acrylic-containing polymer or oligomer. Epoxide-functional acrylic resins preferably derive the epoxy groups from glycidyl methacrylate monomer, glycidyl acrylate, allyl glycidyl ether, cyclohexyl monoepoxy methacrylate, the epoxide of the dimer of cylopentadiene methacrylate, or epoxidized butadiene. Particularly preferred are acrylic resins derived from glycidyl methacrylate.

The above-described epoxide-functional compounds are reacted with a compound containing an organic acid group to open the oxirane ring on the epoxide compound. Useful acids include, without limitation, mono-acids, polyacids, hydroxy acids, and the like. Useful mono-acids include, without limitation, benzoic acid, pivalic acid, Versatic® acid, octanoic acid, butyric acid, dodecanoic acid, benzylphenol, and mixtures including neoalkanoic acids such a neooctanoic acid, neodecanoic acid, and neododecanoic acid. Useful hydroxy acids include, without limitation, dimethylolpropionic acid, hydroxy pivalic acid, malic acid, tartaric acid, and citric acid. When hydroxy acids are used, the reaction is preferably conducted under appropriate conditions so that unwanted reaction of the hydroxyl groups with the epoxy groups is minimized. Useful polyacids include, without limitation, tricarballylic acid, adipic acid, azeleic acid, trimellitic anhydride, citric acid, malic acid, tartaric acid, citric acid, and isophthalic acid. A polyepoxide may also be reacted with a hydroxy acid or a polyacid, although in the case of the polyacid/polyepoxide reaction, the starting materials and reaction conditions should be controlled so as to avoid any unwanted chain extension or branching that could result in high molecular weight compounds that could increase VOC or result in gelation.

The hydroxy group-containing precursor of the first component derived from the acid/epoxy ring-opening reaction is then reacted with cyanic acid and/or a compound comprising a carbamate group or a urea group in order to form the first component. The first component has at least one carbamate group or urea group on average per molecule. Cyanic acid may be formed by the thermal decomposition of urea or by other methods, such as described in U.S. Pat. Nos. 4,389,386 or 4,364,913. When a compound comprising a carbamate or urea group is utilized, the reaction with the hydroxyl group is believed to be a transesterification between the OH group and the carbamate or urea group. The carbamate compound can be any compound having a carbamate group capable of undergoing a reaction (esterification) with a hydroxyl group.

These include, for example, methyl carbamate, butyl carbamate, propyl carbamate, 2-ethylhexyl carbamate, cyclohexyl carbamate, phenyl carbamate, hydroxypropyl carbamate, hydroxyethyl carbamate, hydroxybutyl carbamate, and the like. Useful carbamate compounds can be characterized by the formula:

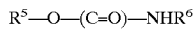

R⁵—O—(C=O)—NHR⁶ wherein R⁵ is substituted or unsubstituted alkyl (preferably of one to eight carbon atoms, more preferably of one to four carbon atoms) and R⁶ is H, substituted or unsubstituted alkyl (preferably of 1–8 carbon atoms, more preferably of one to four carbon atoms), substituted or unsubstituted cycloalkyl (preferably of 6–10 carbon atoms), or substituted or unsubstituted aryl (preferably of 6–10 carbon atoms). Preferably, R⁶ is H.

Urea groups can generally be characterized by the formula

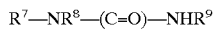

R⁷—NR⁸—(C=O)—NHR⁹ wherein R⁸ and R⁹ each independently represents H or alkyl, preferably of 1 to 4 carbon atoms, or R⁸ and R⁹ may together form a heterocyclic ring structure (e.g., where R⁸ and R⁹ form an ethylene bridge), and wherein R⁷ represents a substituted or unsubstituted alkyl (preferably of one to eight carbon atoms, more preferably of one to four carbon atoms).

The transesterification reaction between the carbamate or urea and the hydroxyl group-containing compounds can be conducted under typical transesterification conditions, for example temperatures from room temperature to 150° C., with transesterification catalysts such as calcium octoate, metal hydroxides, such as KOH, Group I or II metals, such as sodium and lithium, metal carbonates, such as potassium carbonate or magnesium carbonate, which may be enhanced by use in combination with crown ethers, metal oxides like dibutyltin oxide, metal alkoxides such as NaOCH₃ and Al(OC₃H₇)₃, metal esters like stannous octoate and calcium octoate, or protic acids such as H₂SO₄ or Ph₄SbI. The reaction may also be conducted at room temperature with a polymer-supported catalyst such as Amberlyst-15® (Rohm & Haas) as described by R. Anand, *Synthetic Communications*, 24(19), 2743–47 (1994), the disclosure of which is incorporated herein by reference.

The ring-opening of the oxirane ring of an epoxide compound by a carboxylic acid results in a hydroxy ester structure. Subsequent transesterification of the hydroxyl group on this structure by the carbamate compound results in a carbamate-functional component that can be represented by either of the structures:

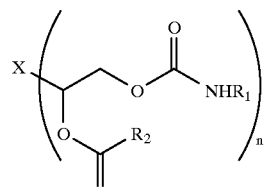

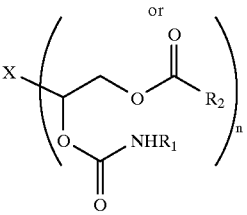

or a combination thereof, wherein n is a positive integer of at least 1, R₁ represents H, alkyl, or cycloalkyl, and R₂ represents alkyl, aryl, or cycloalkyl, and X represents an organic radical that is a residue of the epoxide compound. As used herein, it should be understood that these alkyl, aryl, or cycloalkyl groups may be substituted. For example, where a monoepoxide is reacted with a polyacid, R₂ in the above structures would represent the residue of the polyacid, and could be substituted with other carbamate group(s) resulting from the other acid groups on the polyacid reacting with the monoepoxide followed by transesterification with the carbamate compound.

Two different kinds of functional groups may be present on each molecule in the first component. In one preferred embodiment, the reaction product of the epoxide functional compound and the organic acid has, on average, more than one hydroxyl group per compound and, on average, less than all of the hydroxyl groups are reacted with the cyanic acid or the compound comprising a carbamate or urea group. In a particularly preferred embodiment, the reaction product of the epoxide-functional compound and the organic acid has from about two to about four hydroxyl groups per molecule and only part of these groups, on average, are reacted to form a carbamate group or urea group on the compound of component (a). In another preferred embodiment, the precursor product of the reaction of the epoxide-functional compound with the organic acid has residual acid groups resulting from reaction of a stoichiometric excess of acid groups or residual epoxide groups resulting from reaction of a stoichiometric excess of epoxide groups. The hydroxyl group or groups formed are then reacted with the cyanic acid or the compound comprising a carbamate or urea group to form a compound of component (a) having a carbamate or urea functionality as well as epoxide or acid functionality.

The compositions of the invention also include a curing agent (b) that has a plurality of groups reactive with functional groups on the first component (a). The first component has carbamate or urea functionality, but, as described above, may also have one or more functional groups of a different kind, such as hydroxyl, epoxide, or carboxyl groups and combinations of these. Useful curing agents are those known in the art to be reactive with one or more of the functionalities of component (a).

Useful curing agents include materials having active methylol or methylalkoxy groups, such as aminoplast crosslinking agents or phenol/formaldehyde adducts; curing agents that have isocyanate groups, particularly blocked isocyanate curing agents, curing agents that have epoxide groups, amine groups, acid groups, siloxane groups, cyclic carbonate groups, and anhydride groups; and mixtures thereof. Examples of preferred curing agent compounds include, without limitation, melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Another suitable crosslinking agents include tris(alkoxy carbonylamino) triazine,( available from Cytec Industries under the tradename TACT). The curing agent may be combinations of these, particularly combinations that include aminoplast crosslinking agents. Aminoplast resins such as melamine formaldehyde resins or urea formaldehyde resins are especially preferred. Combinations of TACT with a melamine formaldehyde resin and/or a blocked isocyanate curing agent is suitable and desirable.

According to the present invention, component (a), component (b), or both components (a) and (b) should have at least one group per molecule that is reactive with the functionality on component (c). This is preferably accomplished through the selection of an aminoplast as component (b) when the component (c) has urea, carbamate, or hydroxy functionality or inclusion of acid groups in one of components (a) or (b) when component (c) has epoxide groups or epoxide groups in one of components (a) or (b) when component (c) has acid groups. Depending on the cure conditions, other compounds identified above as component (b) may also be reactive with the carbamate or urea group(s) on component (c). Component (c) may also contain groups that are reactive with the carbamate group of component (a), such as an acrylic polymer containing polymerized isobutoxymethyl acrylamide groups. In yet another preferred embodiment, compound (c) has oxazolidine functionality.

In general, then, the second compound of component (c) has functional groups that are reactive with either the first compound or with the curing agent. The second compound may be a simple compound, an oligomer, or a polymeric material. The second compound of (c) preferably has functionality selected from oxazolidine, epoxide, or active hydrogen-containing functional groups. Such groups include, for example, hydroxyl groups, carbamate groups, urea groups, amino groups, thiol groups, hydrazide groups, and activated methylene groups.

The component (c) may include an oligomeric or polymeric resin. Such resins include, for example, acrylic polymers, modified acrylic polymers, polyesters, polyepoxides, polycarbonates, polyurethanes, polyamides, polyimides, and polysiloxanes, all of which are well-known in the art. Preferably, the resin is an acrylic, modified acrylic or polyester. More preferably, the resin is an acrylic resin. In one preferred embodiment of the invention, the second compound is an acrylic resin or polymer. The acrylic resin preferably has a molecular weight of 500 to 1,000,000, and more preferably of 1500 to 50,000. As used herein, "molecular weight" refers to number average molecular weight, which may be determined by the GPC method using a polystyrene standard. Such polymers can be prepared from monomers such as methyl acrylate, acrylic acid, methacrylic acid, methyl methacrylate, butyl methacrylate, cyclohexyl methacrylate, and the like. The functional group can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like; amino-functional acrylic monomers would include t-butylaminoethyl methacrylate and t-butylamino-ethylacrylate; acid-functional monomers would include acrylic acid, methacrylic acid, and itaconic acid; epoxide-functional monomers would include glycidyl acrylate and glycidyl methacrylate; and so on.

Modified acrylics can also be used as the polymer (a) according to the invention. Such acrylics may be polyester-modified acrylics or polyurethane-modified acrylics, as is well-known in the art. Polyester-modified acrylics modified with e-caprolactone are described in U.S. Pat. No. 4,546,046 of Etzell et al., the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having epoxide groups or active hydrogen groups such as hydroxyl groups, acid groups, or carbamate groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol). Carbamate-functional polyesters are disclosed in U.S. Pat. Nos. 5,508,379, 5,451,656, and 5,532,061, the disclosures of each of which is incorporated herein by reference. Polyesters having epoxide groups may be formed from unsaturated polyesters or from hydroxyl- or acid-functional polyesters according to the methods described above for synthesis of component (a).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like. Polyurethanes having epoxide groups may be formed from unsaturated polyurethanes or from hydroxyl- or acid-functional polyurethanes according to the methods described above for synthesis of component (a). Acid-functional polyurethanes may be synthesized by including a monomer having acid functionality, such as, without limitation, dimethylolpropionic acid. The hydroxyl groups react to form the urethane linkages while the acid group remains unreacted in the polyurethane polymerization.

In one embodiment, the second component may include a carbamate-functional resin or polymer. A carbamate-functional resin or polymer can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy-functional monomer with cyanic acid (which may be formed by the thermal decomposition of urea) to form the carbamyloxy carboxylate (i.e., carbamate-modified (meth)acrylate). Another method of synthesis reacts an $\alpha,\beta$-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing a carbamate-functional polymer is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (c) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate and isocyanatoethyl methacrylate. Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

A carbamate-functional addition polymer component can be represented by the randomly repeating units according to the following formula:

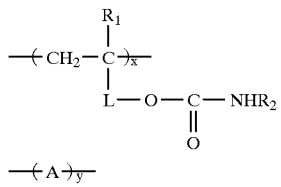

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents polymerized units derived from one or more ethylenically unsaturated comonomers. Such monomers for copolymerization are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate, styrene, vinyl toluene and the like. Suitable comonomers also include monomer having other functionalities, including hydroxyl, acid, and epoxide functionalities.

L represents a divalent linking group, preferably an aliphatic of 1 to 8 carbon atoms, cycloaliphatic, or aromatic linking group of 6 to 10 carbon atoms. Examples of L include

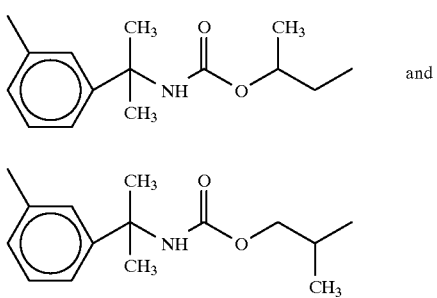

—(CH$_2$)—, —(CH$_2$)$_2$—, —(CH$_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

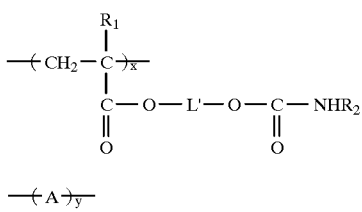

In this formula, $R_1$, $R_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

Component (c) may include a compound based on a urea or carbamate compound having a second, active hydrogen functional group, such as a hydroxyalkyl carbamate or hydroxyalkyl urea. The hydroxyalkyl carbamate may be, for example and without limitation, hydroxyethyl carbamate, hydroxypropyl carbamate, hydroxybutyl carbamate, and mixtures of these carbamate compounds. The hydroxyalkyl urea may be, for example, hydroxyethylethylene urea. In a first preferred embodiment, the component (c) compound is the reaction product of a compound having a carbamate or urea group (preferably primary, that is, an unsubstituted carbamate or urea group, with $R^6$ or $R^9$ in the structures above being H) or a group that can be converted to a carbamate or urea group and an active hydrogen group, such as the hydroxyalkyl carbamate or urea, with a lactone or a hydroxy acid compound, preferably with a lactone, and particularly preferably with ε-caprolactone. In a second preferred embodiment, the reaction product of the first preferred embodiment is further reacted with a compound that is reactive with hydroxyl groups on a plurality of molecule of the first reaction product but that is not reactive with the carbamate or urea groups. Such a compound reactive with a plurality of hydroxyl groups is preferably an isocyanate, for example and without limitation a diisocyanate, a triisocyanate, a biuret, or an isocyanurate. In a third preferred embodiment, the component (c) compound is the reaction product of a hydroxyalkyl carbamate or urea with a compound that is reactive with hydroxyl groups, such as an isocyanate, for example and without limitation a diisocyanate, a triisocyanate, a biuret, or an isocyanurate. In a fourth preferred embodiment, the component (c) compound is the reaction product of a hydroxyalkyl carbamate or urea with a compound that is reactive with hydroxyl groups, such as an isocyanate, for example and without limitation a diisocyanate, a triisocyanate, a biuret, or an isocyanurate, in which at least one isocyanate group (or other group reactive with hydroxyl groups) remains unreacted per molecule, and is reacted with a polyol such a diol or triol. The polyol may be linear or branched. Preferred polyols are 2-ethyl-1,6-hexanediol, Esterdiol 204 (available from Eastman Chemical Co.) and cyclohexanedimethanol (CHDM). In a fifth preferred embodiment, (c) includes a carbamated polyol, particularly of a diol or a triol having a molecular weight of at least about 150, preferably a molecular weight of at least about 200, also preferably a molecular weight of up to about 1500, preferably a molecular weight of up to about 1200, and particularly preferably a molecular weight of up to about 900, which may be synthesized according to the methods described above for preparation of a carbamate material from a hydroxyl-functional resin. For example, the carbamated polyol may be prepared by reaction of methyl carbamate with the polyol in the present of a tin catalyst.

Further suitable materials for component (c) include oxazolidine functional materials such as 1-aza-3,7-dioxo-bicyclo-2,8-diisopropyl-5-ethyl(3.3.0)-octane (available from Angus Chemical Company, Buffalo Grove, Ill., under the tradename Zoldine® RD-20), carboxyl-functional acrylics, and epoxide-functional acrylics.

Other compounds that are preferred as component (c) or as part of a mixture of compounds as component (c) are low molecular weight carbamate or urea components as described in U.S. patent application Ser. No. 08/698,529; U.S. Pat. No. 5,532,061; and U.S. Pat. No. 5,451,656, the disclosure of each of these three documents being incorporated herein by reference. In particular, examples of such useful low molecular weight components may have, in addition to a carbamate or urea group, other functional group(s) including, without limitation, hydroxyl groups, amino groups, epoxy groups, isocyanate groups, siloxane or silane groups, mercapto groups, substituted or unsubstituted amides, anhydrides, activated methylene groups (activated, for example, by acetoacetate groups).

Component (c) may also comprise a compound comprising a plurality of functional crosslinking groups, at least one of which is a carbamate functional group or a urea functional group, which compound also includes at least one carbonate group. A carbonate group may be represented by the structure:

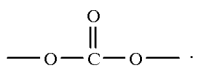

Component (c) may also comprise the reaction product of the first embodiment that is further reactive with a component reactive therewith to convert the hydroxyl to, or adduct onto the compound at the hydroxyl, a carbamate or urea group or a group that can then be converted to a carbamate or urea group in a second reaction step.

There are a number of different synthetic approaches for preparing multifunctional compounds having at least one carbamate or urea functional group. The approaches described below are intended by way of enablement and exemplification of techniques for the preparation of such compounds, not by way of limitation. Those skilled in the art will be able to prepare different types of compounds in different ways than illustrated below, once in possession of the knowledge of the present invention.

In a sixth preferred embodiment of the invention, a compound (c) can be prepared by reacting a hydroxy carboxylic acid (e.g., dimethylhydroxy propionic acid, tartaric acid, lactic acid, hydroxy stearic acid, N-(2-hydroxyethyl) ethylene diamine triacetic acid, 2-hydroxyethyl benzoic acid) with a hydroxy carbamate or a hydroxy urea to esterify the hydroxyl on the carbamate or urea compound with the acid group on the hydroxy carboxylic acid. The resulting compound has a carbamate or urea functional group, a hydroxyl functional group, and an ester hydrogen bond acceptor group. This reaction is preferably performed at temperatures of room temperature to 150° C., also preferably with a polymer-supported catalyst such as Amberlyst® 15 (Rohm & Haas). The reaction mixture should contain an excess of the alcohol to minimize self-condensation of the hydroxy carboxylic acid.

In a number of the preferred embodiments mentioned above, an ester-containing carbamate- or urea-functional compound can be prepared via a ring-opening reaction of a lactone or by reaction with a hydroxy acid compound. The compound of component (c) can be formed, for example and without limitation, by reacting a lactone with a compound having an active hydrogen group capable of ring-opening the lactone (e.g., hydroxyl, primary amine, acid) and a carbamate or urea group or a group that can be converted to carbamate or urea. When a compound having an active hydrogen group and a group that can be converted to carbamate or urea is used to ring-open the lactone, conversion of the group to a carbamate or urea can be accomplished during or after the ring-opening reaction.

Compounds having a carbamate or urea group and an active hydrogen group are known in the art. Hydroxypropyl carbamate and hydroxyethyl ethylene urea, for example, are well known and commercially available. Amino carbamates are described in U.S. Pat. No. 2,842,523. Hydroxyl ureas may also be prepared by reacting an oxazolidone with ammonia or a primary amine or by reacting ethylene oxide with ammonia to form an amino alcohol and then reacting the amine group of that compound or any other amino alcohol with hydrochloric acid, then urea to form a hydroxy urea. Amino ureas can be prepared, for example, by reacting a ketone with a diamine having one amine group protected from reaction (e.g., by steric hindrance), followed by reaction with HNCO (i.e., the product of the thermal decomposition of urea), and then water. Alternatively, these compounds can be prepared by starting with a compound having an active hydrogen and a group that can be converted to carbamate or urea as described below, and then converting that group to the carbamate or urea prior to commencement of the lactone ring-opening reaction.

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a b-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., , $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Other groups, such as hydroxyl groups or isocyanate groups can also be converted to carbamate groups. However, if such groups were to be present on the compound and then converted to carbamate after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Hydroxyl groups can be converted to carbamate groups by reaction with a monoisocyanate (e.g., methyl isocyanate) to form a secondary carbamate group or with cyanic acid (which may be formed in situ by thermal decomposition of urea) to form a primary carbamate group (i.e., unsubstituted carbamates). This reaction preferably occurs in the presence of a catalyst as is known in the art. A hydroxyl group can also be reacted with phosgene and then ammonia to form a compound having primary carbamate group(s), or by reaction of a hydroxyl with phosgene and then a primary amine to form a compound having secondary carbamate groups. Another approach is to react an isocyanate with a compound such as hydroxyalkyl carbamate to form a carbamate-capped isocyanate derivative. For example, one isocyanate group on toluene diisocyanate can be reacted with hydroxypropyl carbamate, followed by reaction of the other isocyanate group with an excess of polyol to form a hydroxy carbamate. Finally, carbamates can be prepared by a transesterification approach where hydroxyl group reacted with an alkyl carbamate (e.g., methyl carbamate, ethyl carbamate, butyl carbamate) as previously described hereinabove to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Groups such as oxazolidone can also be converted to urea after the ring-opening reaction with the lactone. For example, hydroxyethyl oxazolidone can be used to initiate the ring-opening reaction with the lactone, followed by reaction of ammonia or a primary amine with the oxazolidone to generate the urea functional group. Other groups, such as amino groups or isocyanate groups can also be converted to urea groups to form a compound. However, if such groups were to be present on the compound and then converted to urea after the ring-opening reaction with the lactone, they would have to be blocked so that they would not react with the lactone or with the active hydrogen groups involved in the lactone ring-opening reaction. When blocking these groups is not feasible, the conversion to carbamate or urea would have to be completed prior to the lactone ring-opening reaction. Amino groups can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a ureacapped isocyanate derivative. For example, one isocyanate group on toluene diisocyanate can be reacted with hydroxyethyl ethylene urea, followed by reaction of the other isocyanate group with an excess of polyol to form a hydroxy carbamate.

One preferred class of compounds having an active hydrogen group and a group that can be converted to carbamate is the hydroxyalkyl cyclic carbonates. Hydroxyalkyl cyclic carbonates can be prepared by a number of approaches. Certain hydroxyalkyl cyclic carbonates like 3-hydroxypropyl carbonate (i.e., glycerine carbonate) are commercially available. Cyclic carbonate compounds can be synthesized by any of several different approaches. One approach involves reacting an epoxy group-containing compound with $CO_2$, under conditions and with catalysts as described hereinabove. Epoxides can also be reacted with b-butyrolactone in the presence of such catalysts. In another approach, a glycol like glycerine is reacted at temperatures of at least 80° C. with diethyl carbonate in the presence of a catalyst (e.g., potassium carbonate) to form a hydroxyalkyl carbonate. Alternatively, a functional compound containing a ketal of a 1,2-diol having the structure:

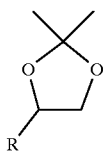

can be ring-opened with water, preferably with a trace amount of acid, to form a 1,2-glycol, which is then further reacted with diethyl carbonate to form the cyclic carbonate.

Cyclic carbonates typically have 5-6-membered rings, as is known in the art. Five-membered rings are preferred, due to their ease of synthesis and greater degree of commercial availability. Six-membered rings can be synthesized by reacting phosgene with 1,3-propane diol under conditions known in the art for the formation of cyclic carbonates. Preferred hydroxyalkyl cyclic carbonates used in the practice can be represented by the formula:

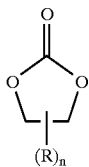

where R (or each instance of R if n is more than 1) is a hydroxyalkyl group of 1–18 carbon atoms, preferably 1–6 carbon atoms, and more preferably 1–3 carbon atoms, which may be linear or branched and may have subsituents in addition to the hydroxyl (which itself may be primary, secondary, or tertiary), and n is 1 or 2, which may be substituted by one or more other substituents such as blocked amines or unsaturated groups. More preferably, R is —$C_mH_{2m}OH$ where the hydroxyl may be primary or secondary and m is 1 to 8, and even more preferably, R is —$(CH_2)_p$—OH where the hydroxyl is primary and p is 1 to 2.

Lactones that can be ring opened by an active hydrogen are well-known in the art. They include, for example, e-caprolactone, g-caprolactone, b-butyrolactone, b-propriolactone, g-butyrolactone, a-methyl-g-butyrolactone, b-methyl-g-butyrolactone, g-valerolactone, d-valerolactone, g-nonanoic lactone, g-octanoic lactone, and pentolactone. In one preferred embodiment, the lactone is e-caprolactone. Lactones useful in the practice of the invention can also be characterized by the formula:

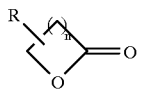

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80–150° C.). The reactants are usually liquids so a solvent is not necessary. However, a solvent may be useful in promoting good conditions for the reaction even if the reactants are liquid. Any non-reactive solvent may be used, including both polar and nonpolar organic solvents. Examples of useful solvents include toluene, xylene, methyl ethyl ketone, methyl isobutyl ketone, and the like. A catalyst is preferably present. Useful catalysts include proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that react will react with the lactone ring.

The lactone ring-opening reaction provides chain extension of the molecule if sufficient amounts of the lactone are present. The relative amounts of the carbamate or urea compound and the lactone can be varied to control the degree of chain extension. The opening of the lactone ring with a hydroxyl or amine group results in the formation of an ester or amide and an OH group. The OH group can then react with another available lactone ring, thus resulting in chain extension. The reaction is thus controlled by the proportion of lactone in the relative to the amount of initiator compound. In the preferred embodiments of the present invention, the ratio of equivalents of lactone from to equivalents of active hydrogen groups on is preferably from 0.1:1 to 10:1, and more preferably from 1:1 to 5:1. When the lactone is opened with an acid, the resulting compound has an acid group, which can then be converted to a hydroxyl group by well-known techniques such as reaction with ethylene oxide.

In another of the aforementioned embodiments, the above-described compound that is the reaction product of a compound having at least one carbamate or urea group (or a group that can be converted to carbamate or urea) as described above and an active hydrogen group with a lactone may be further reacted with a compound that is reactive with the hydroxyl groups on a plurality of molecules of that reaction product, but that is not reactive with the carbamate or urea groups thereon. Thus, in the final product, the residue of compound can be described as a core to which a plurality of carbamate- or urea-functional residues of the reaction product are attached. It is also contemplated that the reaction product may be admixed with other compounds comprising a hydroxyl group plus a carbamate or urea group (e.g., hydroxypropyl carbamate) prior to the reaction with compound. In such a case, the resulting reaction product mixture will reflect the stoichiometric ratio of reaction product to such other compounds.

Compounds that are useful as the compound reactive with the hydroxyl groups on a plurality of molecules resulting from the lactone or hydroxy acid reaction include polyisocyanates, dialkyl carbonates, cyclic carbonates, $CO_2$, acetals, phosgene, cyclic or linear phosphazene, substituted or unsubstituted cyclic siloxanes or silanes, or substituted or unsubstituted linear siloxanes or silanes, which may be described by the formula $SiX_mR_n$ where X is a group that is reactive with protons, such as a halide, alkoxy, hydride, or acetate, R is a group that is non-reactive with protons such as alkyl, silane, or siloxane, m is from 2 to 4, and m+n=4, $SO_2$, $POCl_3$, $POCl_2R$ where R is alkyl or aryl. With certain of the compounds, a diol may also be included in the reaction mixture to obtain chain extension with carbamate or urea termination. This can be done, for example, with phosgene where the phosgene/diol reaction results in chain extension and the reaction of phosgene with the reaction product results in chain termination with a carbamate or urea group.

The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4,'-dibenzyl diisocyanate and 1,2,4-benzene triisocyanate can be used. In addition, the various isomers of α,α,α',α'-tetramethyl xylylene diisocyanate can be used. Oligomeric or polymeric polyisocyanates prepared by reaction of an excess of monomeric polyisocyanates with a polyol may be used. Other monomeric isocyanates include isocyanurates or biurets such as the isocyanurate of isophorone diisocyanate or the isocyanurate of hexamethylene diisocyanate may be used. Biurets of isocyanates such as DESMODUR® N100 from Bayer may also be useful.

Dialkyl carbonates, cyclic carbonates, $CO_2$, diphenyl carbonates, or phosgene may be used as a compound to react with and link two or more reaction product compounds via a carbonate linking group. When phosgene is used, phosgene may be added to a solution of the reaction product at a molar ratio of about 1 mole phosgene to 2 moles reaction product (or 2 moles reaction product plus other hydroxy carbamate or urea compounds such as hydroxypropyl carbamate). This reaction may be conducted at temperatures of less than 7° C. or under pressure in order to maintain phosgene in its liquid state, or alternatively, gaseous phosgene may be bubbled through the system. A salting base (e.g., NaOH) may be used to help drive the reaction. The reaction may be conducted in virtually any aprotic solvent at temperatures of −20° C. to 80° C. and pressures of atmospheric to 40 psi.

Cyclic carbonates or dialkyl carbonates may be reacted with the reaction product by heating (e.g., 80–200° C.) the appropriate molar mixture (2 moles reaction product plus any other hydroxy carbamate or urea and 1 mole cyclic carbonate or dialkyl carbonate) with a transesterification catalyst such as calcium octoate. Useful dialkyl carbonates include diethyl carbonate, dimethyl carbonate, dipropyl carbonate, diphenyl carbonate, and dibutyl carbonate. Useful cyclic carbonates include propylene carbonate, glycerine carbonate, and dimethyl ethylene carbonate. Cyclic carbonates may also be formed from any unsaturated bond by reaction of the unsaturated bond with peroxide to form an oxirane ring, followed by reaction with $CO_2$ to form the cyclic carbonate. Useful catalysts include metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate), or protic acids (e.g., $H_2SO_4$), $MgCO_3$, or $Ph_4SbI$. Any solvents used should be inert to transesterification. The catalysts and/or reaction conditions may need to be adjusted to minimize transesterification of the ester groups from the ring-opened lactone in the reaction product. $CO_2$ may also be used as compound under similar conditions with similar catalysts plus it may be used at pressures of 1 to 40 atm.

Compounds having inorganic reactive groups may also be used to react with the hydroxyl groups of the reaction product. These include phosphorus compounds such as $POCl_3$ or hexachlorocyclotriphosphazene, $SO_2$ sources such as $SO_3$ or $SO_2Cl_2$ or silane-based systems such as substituted or unsubstituted cyclic siloxanes or silanes, or substituted or unsubstituted linear siloxanes or silanes, which may be described by the formula $SiX_mR_n$ where X is a group that is reactive with protons, such as a halide, alkoxy, hydride, or acetate, R is a group that is non-reactive with protons such as alkyl, silane, or siloxane, m is from 2 to 4, and m+n=4.

Phosphorus-containing compounds such as phosphazene-based compounds (e.g., hexachlorocyclotriphosphazene) or $POCl_3$ may be used as compound to react with the reaction product. In a typical reaction, one equivalent (based on chlorine content) of the phosphorus reagent is dissolved in a dry ether solvent such as diethyl ether of tetrahydrofuran to form a solution of approximately 50%. 1.5 equivalents of sodium hydride are added followed by one equivalent of the reaction product (or reaction product plus other hydroxy carbamate or urea compounds). The mixture is allowed to exotherm to the reflux temperature of the solvent, with the reaction temperature controlled by the addition rate of the reaction product. After addition of the reaction product is complete, the reaction mixture is heated to reflux and held for 2–3 hours. The mixture is then cooled, filtered to remove sodium chloride and any unreacted sodium hydride, and the solvent removed under vacuum.

Silane-based compounds may also be used as a linking compound for the OH-functional product. Such compounds may be described by the formula $SiX_mR_n$ where X is a group that is reactive with protons, such as a halide, alkoxy, hydride, or acetate, R is a group that is non-reactive with protons such as alkyl, silane, or siloxane, m is from 2 to 4, and m+n=4. These compounds may react with the reaction product in any dry aprotic solvent (e.g., tetrahydrofuran) under conditions known in the art, which may depend on the nature of the X group. When X is a hydride, the reaction is preferably begun with chilled reactants (e.g., 0° C.) under an inert atmosphere using catalysts such as tin catalysts. After the addition of materials is complete, dry methanol is added to react with any free remaining Si—H bonds. If X is a halide, the reaction is preferably begun under an inert atmosphere at room temperature. The mixture is then heated to reflux to drive the reaction to completion. HCl is given off as a by-product. If X is alkoxy, the reaction is preferably begun under an inert atmosphere at room temperature, which may be maintained for the duration of the reaction. A molecular sieve may be used to absorb the alcohol side product that is formed. Slightly basic or acidic pH will accelerate this reaction; however, it will also accelerate the formation of Si—O—Si bonds.

For $SO_2$ sources, the $SO_3$ can be reacted with the compound by bubbling $SO_3$ through the reaction product if it is in liquid form or by dissolving the compound in a solvent and then bubbling $SO_3$ through the solution. The reaction of $SO_2Cl_2$ with the compound may be assisted by the pre-reaction of the compound with Na or NaOR (where R is an organic radical).

In another embodiment, the hydroxyl group on the reaction product may be converted to carbamate or urea by reaction with a compound reactive with the reaction product to convert a hydroxyl group thereon to a carbamate or urea group, or which comprises a group that is reactive with a hydroxyl group thereon and also a carbamate or urea group or group that can be converted to carbamate or urea. A number of compounds may be used as compound to convert a hydroxyl group on the reaction product to a carbamate group. Hydroxyl groups can be converted to carbamate groups by reaction with a monoisocyanate (e.g., methyl isocyanate) to form a secondary carbamate group or with cyanic acid to form a primary carbamate group (i.e., unsubstituted carbamates) such as in the structure shown above. This reaction is performed under heat, preferably in the presence of a catalyst as is known in the art. A hydroxyl group can also be reacted with phosgene and then ammonia to form a compound having primary carbamate group(s), or by reaction of a hydroxyl with phosgene and then a primary amine to form a compound having secondary carbamate groups.

Various compounds can be used as compound that have a group that is reactive with the hydroxyl group on the reaction product and also a carbamate or urea group or a group that can be converted to carbamate or urea. Alkyl carbamates (e.g., methyl carbamate, butyl carbamate) or substituted alkyl carbamates (e.g., hydroxypropyl carbamate) can be transesterified with the hydroxyl group on the reaction product, as described previously. This reaction is performed under heat, preferably in the presence of a catalyst such as an organometallic catalyst (e.g., dibutyltin dilaurate). A methylol acrylamide can be reacted with the hydroxyl group on the reaction product and then converted to carbamate. In this reaction, the unsaturated bond is then reacted with peroxide, $CO_2$, and ammonia as described above. The epoxy groups are then reacted with $CO_2$ to form cyclic carbonate groups, which are converted to carbamate groups by reaction with ammonia. partially-blocked toluene diisocyanate can also be used as compound. In one embodiment, the unblocked isocyanate on the partially-blocked toluene diisocyanate can be reacted with the hydroxyl group on the reaction product. The other isocyanate can then be unblocked and reacted with a hydroxyalkyl carbamate (e.g., hydroxypropyl carbamate) or a hydroxy urea (e.g., hydroxyethyl ethylene urea). Alternatively, the unblocked isocyanate can be reacted with a hydroxyalkyl carbamate (e.g., hydroxypropyl carbamate) or a hydroxy urea (e.g., hydroxyethyl ethylene urea), followed by unblocking of the other isocyanate group and reaction with the hydroxyl group on the reaction product. Other polyisocyanates can be used to append carbamate or urea groups onto the hydroxyl group on the reaction product, but they will result in competing side reactions where the polyisocyanate reacts with more than one molecule or more than one hydroxyalkyl carbamate or hydroxy urea.

In yet another embodiment, a polyol, amino alcohol, or polyamine (typically a diol or diamine, although polyols or polyamines of higher functionality may also be used) is reacted with a lactone or a hydroxy carboxylic acid to form a polyol having at least one ester or amide group derived from the lactone ring-opening reaction or the hydroxy carboxylic acid condensation reaction. The hydroxyl groups thereon can then be converted to carbamate or urea groups or reacted with a compound having carbamate or urea groups or groups that can carbamate or urea by any of the techniques described above. Polyols derived from lactone ring-opening reactions are commercially available (e.g., under the Tone® polyol product line of Union Carbide Corporation, such as Tone® 0200, Tone® 2221, Tone® 0301, or Tone® 0310) or may be prepared by ring opening a lactone with virtually any polyol or polyamine under the conditions described above for lactone ring opening. Useful polyols can include 1,4-butane diol, 1,6-hexane diol, urethane polyols (which may be formed by reaction of polyisocyanates with an excess of polyol or by the techniques described in U.S. Pat. No. 5,134,205 of Blank), dimer fatty alcohol, and the like. Useful polyamines can include isophorone diamine, bis-[diaminomethyl cyclohexane], bis-[4-aminophenyl methane], polyethylene imine (sold as Polymin® by BASF), and triamino nonane. Useful amino alcohols include hydroxyethyl amine, 5-amino-pentan-1-ol, and aminomethyl propanol.

Carbonate groups may also be incorporated into a carbamate- or urea-functional compound. In one technique, a compound as described above having a carbamate or urea group (or group that can be converted to carbamate or urea) and a hydroxyl group can be reacted with a CO2 source (e.g., $CO_2$, dialkyl carbonate, cyclic carbonate, phosgene, diphenyl carbonate). The hydroxy carbamate or hydroxy urea compound may be any of the types described above as or it may be the reaction product. The $CO_2$ source and the reaction conditions are as described above with regard to the reaction of the reaction product with when is $CO_2$, dialkyl carbonate, cyclic carbonate, phosgene, or diphenyl carbonate.

In another embodiment of the invention, a compound (c) is the reaction product of a substituted or unsubstituted alkyl carbamate (e.g., methyl carbamate, butyl carbamate, hydroxypropyl carbamate) with a polycarbonate having a plurality of hydroxyl groups attached thereto. Such polycarbonate polyols are known in the art and are described, for example, in U.S. Pat. No. 4,024,113, the disclosure of which is incorporated herein by reference. They can be prepared by the transesterification reaction of $CO_2$, a dialkyl carbonate, diphenyl carbonate, phosgene, or a dioxolanone with an excess of a polyol using techniques and catalysts as described above. Examples of useful polyols can include 1,6-hexanediol, 2-ethyl-1,3-hexanediol, neopentyl glycol, cyclohexane-1,4-dimethylol, bisphenol A, polyether polyols such as Pluronic® polyols sold by BASF Corporation, 1,2-hexane diol, and the like. Useful polyols of higher functionality include trimethylol propane, pentaerythritol, acrylic polyols, and the like.

The transesterification reaction between the carbamate compound and the polycarbonate polyol, as generally described earlier, should utilize a catalyst. Such catalysts are known in the art, and are preferably organometallic complexes. Suitable catalysts include tin complexes, such as dibutyltin oxide, dibuyltin dilaurate, dibutyltin diacetate, dibutyltin dimethoxide. Other catalysts, such as aluminum complexes (e.g., aluminum isopropoxide), zinc complexes, titanates, or acid catalysts (e.g., octanoic acid) can also be used. The catalysts and/or reaction conditions may need to be adjusted to minimize interaction with the carbonate groups in the compound.

In yet another embodiment, the compound (c) containing carbonate group(s) can be formed by the above-described standard polyesterification techniques involving a polyol and a $CO_2$ source (e.g., ethylene carbonate, diethyl carbonate, $CO_2$) or phosgene, where the polyol includes a diol having a pendant carbamate group or a pendant urea group. Diols having a pendant carbamate group can be formed by ring-opening a hydroxyalkyl-substituted cyclic carbonate with ammonia or a primary amine using known techniques. Diols having a pendant urea group can be formed by ring-opening a hydroxyalkyl-substituted oxazolidone with ammonia or a primary amine using known techniques.

A compound suitable for component (c) may also contain ether group(s) as group. A carbamate- or urea-functional ether-containing compound may be prepared by using a compound having a carbamate or urea group (or group that can be converted to carbamate or urea) and an active hydrogen group as described above to ring-open an oxirane group on ethylene oxide or propylene oxide in the presence of a catalyst as in the earlier-described epoxide reactions. As with the ring-opening reaction of the lactone, the degree of polyether extension can be controlled by stoichiometry, with the degree of chain extension proportionate to the amount of ethylene oxide or propylene oxide. Alternatively, the hydroxyl groups on a polyether polyol may be transesterified with an alkyl carbamate or reacted with cyanic acid as described above to provide carbamate functionality.

Carbamate- or urea-functional polyurethanes can be prepared by reacting an NCO-terminated polyurethane with a hydroxy carbamate (e.g., hydroxypropyl carbamate) or a hydroxy urea (e.g., hydroxyethyl ethylene urea) using techniques described in U.S. Pat. No. 5,373,069 or by including a carbamate or urea diol (which may be formed by ring-opening a hydroxyalkyl cyclic carbonate or a hydroxyalkyl oxazolidone with ammonia or a primary amine). Polyols other than polyester polyols, which contain hydrogen bond acceptor groups (e.g., polyether polyols, polycarbonate polyols, although it its contemplated that in one embodiment of the invention, polyurethanes derived from polyether polyols are also excluded from the scope of compounds) may be included in the polyol component in the formation of the polyurethane. Alternatively, hydrogen bond acceptor groups may be incorporated, for example, by reacting a compound containing a hydroxyl group and a hydrogen bond acceptor group onto one of the NCO groups on an isocyanurate and then utilizing the other two NCO groups to take part in the polyurethane reaction with a polyol.

Other hydrogen bond acceptor groups can be incorporated into carbamate- or urea-functional compounds (c) by various techniques well-known in the art, such as reacting a polyol containing the desired hydrogen bond acceptor group with cyanic acid or phosgene followed by ammonia to form the carbamate derivative. For example, a sulfide-containing compound (c) can be prepared by reacting a sulfide-containing polyol (e.g., 2,2'-thiodiethanol) with cyanic acid or phosgene/ammonia. Likewise, a sulfone-containing compound can be prepared by reacting a sulfone-containing polyol (e.g., 2,2'-sulfonyldiethanol) with cyanic acid or phosgene/ammonia. Also, a tertiary amine-containing carbamate compound may be prepared by reacting a tertiary amine polyol (e.g., triethanol amine) with cyanic acid or phosgene/ammonia to form the carbamate derivative. Glycolaldehyde dimer can be reacted with cyanic acid or phosgene/ammonia to form a heterocyclic ether-containing carbamate compound. Tertiary amide compounds may be prepared by reacting a tertiary amide polyol (e.g., N,N,N',N'-tetramethyl-D-tartaramide with cyanic acid or phosgene/ammonia. Unsaturate-containing carbamate compounds can be prepared by reacting an unsaturated polyol (e.g., 5-hexene-1,2-diol) with cyanic acid or phosgene/ammonia as well. A ketone-containing compound may be prepared by reacting a ketone polyol (e.g., erythrulose) with cyanic acid or phosgene/ammonia.

Carbamate- or urea-functional compounds containing such other hydrogen bond acceptor groups can also be prepared from compounds containing the hydrogen bond acceptor group and a single active hydrogen group by partially reacting a isocyanurate compound with two moles of a compound such as hydroxypropyl carbamate or hydroxyethyl ethylene urea and one mole of the hydrogen bond acceptor compound. Examples of hydrogen bond acceptor compounds useful in such a synthesis technique include 1-hydroxycyclohexyl phenyl ketone, 2-hydroxyethyl-2-pyrrolidone, 3-hydroxyl-methylpiperidine, diacetone alcohol, diacetin, 2-hydroxymethyl-12-crown-4, 4-(2-hydroxyethyl)-morpholine.

Combinations of the above-described types of hydrogen bond acceptor groups may be used in carbamate- or urea-functional compounds according to the invention. This occurs, for example, if 4-(2-hydroxyethyl)-morpholine is incorporated into a carbamate- or urea-functional compound as described above. Another example of a combination of hydrogen bond acceptor groups occurs if two ester-containing carbamate compounds are linked together with $CO_2$ to form a carbonate linkage, thus forming a compound containing both ester and carbonate hydrogen bond acceptor groups.

In an alternative preferred embodiment, the component (c) comprises a carbamate-functional material that is the reaction product of a mixture comprising a first material, which may be monomeric, oligomeric or polymeric, with a compound comprising a group that is reactive with said first material and a carbamate group or group that can be converted to carbamate, wherein the first material is the reaction product of a mixture including a polyisocyanate and an active hydrogen-containing chain extension agent. Such materials are described in U.S. Pat. No. 5,373,069, incorporated herein by reference. Preferred are isocyanate-functional first materials reacted with hydroxy carbamate compounds. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of α,α,α',α'-tetramethyl xylylene diisocyanate can be used. Also useful as the polyisocyanate are isocyanurates such as DESMODUR® 3300 from Mobay and biurets of isocyanates such as DESMODUR®N100 from Mobay. Particularly preferred are isophorone diisocyanate, hexamethylene diisocyanate, and 1,4-methylene bis-(cyclohexyl isocyanate).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. For purposes of this aspect of the invention both primary and secondary amine groups are considered as having one active hydrogen. Active hydrogen-containing chain extension agents also include water. In a preferred embodiment of the invention, a polyol is used as the chain extension agent. In an especially preferred embodiment, a diol is used as the chain extension agent with little or no higher polyols, so as to minimize branching. Examples of preferred diols which are used as polyurethane chain extenders include 1,6-hexanediol, cyclohexanedimethylol (sold as CHDM by Eastman Chemical Co.), 2-ethyl-1,6-hexanediol, Esterdiol 204 (sold by Eastman Chemical Co.), and 1,4-butanediol. While polyhydroxy compounds containing at least three hydroxyl groups may be used as chain extenders, the use of these compounds produces branched polyurethane resins. These higher functional polyhydroxy compounds include, for example, trimethylolpropane, trimethylolethane, pentaerythritol, among other compounds.

The first material may be chain extended in any manner using these compounds having at least two active hydrogen groups. Thus, these compounds may be added to the mixture of polyisocyanate, polyol, and multi-functional compound, or alternatively, may react at an intermediate stage, to link two free isocyanate groups that are present at the terminal ends of an intermediate polymer. Polymeric chain extension agents can also be used, such as polyester polyols, polyether polyols, polyurethane polyols, or polymeric amino group-containing polymers, as is known in the art. Mixtures of any of the above chain extension agents can also be used.

The reaction of the polyisocyanate and polyol is conducted by heating the components in a suitable reaction medium such as xylene or propylene glycol monoethylether acetate. The use of catalysts for this reaction, e.g., organotin catalysts such as dibutyltin diacetate, is well-known in the art. The degree of polymerization is controlled by the duration of the maintenance of the elevated temperature reaction conditions. Materials useful as the first material may have a number average molecular weight of from 600 to 6000. Various groups, such as nonionic polyether stabilizing groups, ionic stabilizing groups (e.g., carboxyl groups), unsaturated bond groups, and the like may be incorporated or appended to the material, as is known in the art.

The first material that may be used in preparing the component (c) of the invention contains one or more functional groups for reaction with the carbamate-containing compound. Examples of these groups include isocyanate groups, hydroxyl groups, epoxy groups, unsaturated double bonds, carboxylic acid groups, and ketals. In a preferred embodiment, the functional group on the first material is a terminal isocyanate group. A molar ratio of active hydrogen:NCO in the reaction mixture of less than 1 will tend to provide isocyanate-terminated polymers. The functional groups on the first material may be terminal groups or they may be pendant groups. Active hydrogen or isocyanate terminal groups may be provided by adjusting the stoichiometry of the chain extension agent and polyisocyanate in the reaction mixture. Other terminal groups may be provided by the use of capping agents. For example, an acid terminal group can be provided by capping the polymer with a hydroxyacid. Pendant functional groups may be provided by using chain extension agents having two active hydrogen groups and the desired functional group, e.g., dimethanol propionic acid, as is well-known in the art.

The compound that has a group that is reactive with the functional group on the first material also has either a carbamate group or a group that is capable of forming a carbamate group. Groups that are capable of forming a carbamate group include cyclic carbonate groups, epoxide groups, and unsaturated double bond groups. Cyclic carbonate groups can be converted to carbamate groups by reaction with ammonia. Epoxide groups can be converted to carbamate by reaction with $CO_2$ and then ammonia. Unsaturated double bond groups can be converted to carbamate by reaction with peroxide, then $CO_2$ and ammonia. The group on compound that reacts with the first material depends on the specific functional group on the first material with which the reaction is to take place. If the functional group is an isocyanate group, the group on the carbamate-containing compound is preferably an active hydrogen-containing group such as hydroxyl or amino. For example, an isocyanate group on the first material can be reacted with a hydroxyalkyl carbamate, or with a hydroxy-containing epoxide with the epoxy group subsequently converted to carbamate by reaction with $CO_2$ and then ammonia. Preferably, the first material is reacted with hydroxyethyl carbamate, hydroxypropyl carbamate, hydroxybutyl carbamate, or mixtures thereof. If the functional group is hydroxyl, the reactive group on the carbamate-containing compound may be oxygen of the COO portion of the carbamate group on an alkyl carbamate or methylol, such as with methylol acrylamide (HO—$CH_2$—NH—CO—CH=$CH_2$). In the case of the COO group on an alkyl carbamate, the hydroxyl group on the first material undergoes a transesterification with the COO group, resulting in the carbamate group being appended to the polymer. In the case of methylol acrylamide, the unsaturated double bond is then reacted with peroxide, $CO_2$, and ammonia as described above. If the functional group on the fist material is a carboxyl group, the acid group can be reacted with epichlorohydrin to form a monoglycidyl ester, which can be converted to carbamate by reaction with $CO_2$, and then ammonia. Alternatively, an acid-functional group on the first material can be reacted with acetic anhydride to generate an anhydride, which can then be reacted with a compound having an active hydrogen group such as hydroxyl and a carbamate group or group that can be converted to carbamate.

Examples of suitable compounds with groups that can be converted to a carbamate include active hydrogen-containing cyclic carbonate compounds (e.g., the reaction product of glycidol and $CO_2$) that are convertible to carbamate by reaction with ammonia, monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia. Any of the above compounds can be utilized as compounds containing carbamate groups rather than groups convertible to carbamate by converting the group to carbamate prior to reaction with the polymer.

A compound also suitable for component (c) is the reaction product of an active hydrogen-containing chain extension agent as just described with a first reaction product of a compound having a carbamate group or a group that can be converted to carbamate and an isocyanate-reactive group with a polyisocyanate, such as those described above, in which the first reaction product has at least one unreacted isocyanate group remaining.

The compound may also contain a carbamate group and a group that is reactive with NCO on a polymer. Examples of compounds containing a carbamate group and a group that is reactive with NCO include hydroxyethyl carbamate, hydroxypropyl carbamate, and hydroxybutyl carbamate.

Also suitable as component (c) is a carbamate-functional compound that is the reaction product of a monomeric polyisocyanate and a compound comprising a group that is reactive with isocyanate and a carbamate group or group that can be converted into a carbamate. Such compounds are described in U.S. Pat. No. 5,512,639, the entire disclosure of which is incorporated herein by reference. When the monomeric isocyanate is reacted with a compound with the group reactive with isocyanate and a group that can be converted into a carbamate group, then a second step of conversion of the latter group into a carbamate group is taken following the reaction with the monomeric isocyanate. The monomeric polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediiscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylylene diisocyanate can be used. Biurets of isocyanates such as DESMODUR® N100 from Mobay may also be useful.

In one embodiment of the invention, the monomeric polyisocyanate is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on the polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional polyisocyanate (which can be formed by reacting a polyisocyanate with an amino alcohol) can be reacted with the oxygen of a COO portion of the carbamate group on an alkyl carbamate or with the methylol group of methylol acrylamide (HO—$CH_2$—NH—CO—CH=$CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide, $CO_2$, and ammonia as described above. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxyfunctional carboxylic acid) can be reacted with acetic anhydride to generate an anhydride-functional triisocyanurate, which can then be reacted with an hydroxycarbamate.

The above-described monomeric polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

Particularly preferred are the reaction products of hydroxypropyl carbamate, or hydroxybutyl carbamate or mixtures thereof with the isocyanurate of an aliphatic diisocyanate, especially isophorone diisocyanate, hexamethylene diisocyanate, or mixtures of the isocyanurates of these diisocyanates.

In yet another preferred embodiment, component (c) is a carbamate-functional compound that is the reaction product of a monomeric polyisocyanate and a compound comprising a group that is reactive with isocyanate and a carbamate group or group that can be converted into a carbamate, as described above, with the modification that not all of the available isocyanate groups are reacted with the carbamate-containing compound. The remaining isocyanate groups are reacted with a polyol. Suitable polyols include, without limitation, 1,6-hexanediol, cyclohexanedimethylol (sold as CHDM by Eastman Chemical Co.), 2-ethyl-1,6-hexanediol, Esterdiol 204 (sold by Eastman Chemical Co.), and 1,4-butanediol, 1,5-pentanediol, and neopentyl glycol. In a particularly preferred embodiment, the monomeric isocyanate is a diisocyanate, especially isophorone or hexamethylene diisocyanate and half of the available isocyanate groups are reacted with a compound comprising a group that is reactive with isocyanate and a carbamate group or group that can be converted into a carbamate group, preferably with hydroxypropyl carbamate, and the remaining isocyanate groups are reacted with a polyol, particularly with 2-ethyl-1,6-hexanediol.

Another suitable coating agent is Exx-RD™ 100 reactive diluent, available from Exxon Chemical Co. Exx-RD™ 100 is a hydroxybenzoate- and neoalkanoate-diester of glycerol.

Component (c) may also include mixtures of any of the materials described above as suitable for component (c).

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The first compounds according to the present invention are preferably reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

Preparation 1

In the first step, 89 parts of citric acid, a 25% aliquot of the stoichiometric ratio, was charged with 1470 parts of Glydexx® N-10 glycidyl neodecanoate to a reaction vessel. The mixture was heated to a temperature of 128° C. After a slight exotherm, three more 25% increments of 89 parts of the citric acid were added spaced over a 4-hour period and the temperature was maintained at 130° C. The reaction was monitored via acid number to a value of <3 and contained no residual epoxy groups.

In step two, 840 parts of methyl carbamate, a 50% excess, was added along with 12.8 parts of dibutyltin oxide catalyst and 1200 parts of toluene. A reflux temperature of 109–117° C. was maintained for 32 hours as methanol was trapped off. The progress of the reaction was monitored by hydroxyl number to at least 95% completion. The excess methyl carbamate and solvent were stripped off and 425 parts of amyl acetate was added to reduce to a non-volatile content of 80%.

Preparation 2

5940 grams of $\epsilon$-caprolactone, 2610 grams of hydroxypropyl carbamate, and 450 grams of xylene were added to a glass round-bottom flask equipped with stirrer, thermometer, and inert gas inlet. After thorough mixing, under inert atmosphere, 15.3 grams of stannous octoate was added. The mixture was heated to 130 degrees C. and maintained at that temperature for a period of 4.5 hours, then cooled to room temperature.

Preparation 3

1800 grams of Cardura E Ester (glycidyl ester of tertiary carboxylic acid available from Shell Chemical Co.) and 109.5 grams of citric acid were charged to a round-bottom flask equipped with a stirrer, thermometer, heating mantle, and inert gas inlet. This mixture was heated to 127° C. under inert atmosphere, the mantle lowered, and allowed to exotherm to about 140°. After cooling to about 125° C., another 109.5 grams of citric acid were added and stirred for 30 minutes. This last step was repeated twice more until a total of 438 grams of citric acid had been added. The mixture was stirred for an additional 30 minutes and then allowed to cool. The acid number was measured as 1.6 mg KOH/g NV.

Preparation 4

1931 grams of Cardura E Ester (glycidyl ester of tertiary carboxylic acid available from Shell Chemical Co.) and 116.3 grams of tartaric acid were charged to a round-bottom flask equipped with a stirrer, thermometer, heating mantle, and inert gas inlet. This mixture was heated to 130° C. under inert atmosphere, the mantle lowered, and allowed to exotherm to about 145°. After cooling to about 125° C., another 116.3 grams of tartaric acid were added and stirred for 30 minutes. This last step was repeated twice more until a total of 465 grams of tartaric acid had been added. The mixture was stirred for an additional 30 minutes and then allowed to cool. The measured acid number was 5 mg KOH/g NV.

EXAMPLE 1

A clearcoat coating composition was prepared by mixing together 147.4 grams of the resin of Preparation 1, 131.7 grams of the resin of Preparation 2, 49.2 grams Resimene® 747 (a hexamethoxymethyl melamine available from Solutia Inc., Springfield Mass.), 3.0 grams of a UVA solution (85% nonvolatile by weight), 47.1 grams of a UVA solution (14% nonvolatile by weight), 4.5 grams of a hindered amine light stabilizer, 0.5 gram of a rheology control agent (60% nonvolatile by weight), 18.0 grams of a blocked sulfonic acid catalyst (25% active by weight), 21.0 grams of n-butanol, and 25.2 grams of Exxate 600 (an oxo-hexyl acetate available from Exxon Chemical Co.). The calculated theoretical solids for the composition was 67.0% NV by weight.

EXAMPLE 2

A clearcoat coating composition was prepared by mixing together 140.3 grams of the resin of Preparation 1, 110.5 grams of Zoldine® RD-20 (available fro Angus Chemical Co., Buffalo Grove, Ill.), 60.6 grams Resimene® 747, 3.0 grams of a UVA solution (85% nonvolatile by weight), 47.1 grams of a UVA solution (14% nonvolatile by weight), 4.5 grams of a hindered amine light stabilizer, 0.5 gram of a rheology control agent (60% nonvolatile by weight), 18.0 grams of a blocked sulfonic acid catalyst (25% active by weight), 21.0 grams of n-butanol, and 32.5 grams of Exxate 600 (an oxo-hexyl acetate available from Exxon Chemical Company). The calculated theoretical solids for the composition was 68.5% NV by weight.

EXAMPLE 3

A clearcoat coating composition was prepared by mixing together 134.0 grams of the resin of Preparation 1, 105.6 grams of the resin of Preparation 4, 70.4 grams Resimene® 747, 3.0 grams of a UVA solution (85% nonvolatile by weight), 47.1 grams of a UVA solution (14% nonvolatile by weight), 4.5 grams of a hindered amine light stabilizer, 0.5 gram of a rheology control agent (60% nonvolatile by weight), 18.0 grams of a blocked sulfonic acid catalyst (25% active by weight), 21.0 grams of n-butanol, and 55.3 grams of Exxate 600 (an oxo-hexyl acetate available from Exxon Chemical Company). The calculated theoretical solids for the composition was 65.3% NV by weight.

EXAMPLE 4

A clearcoat coating composition was prepared by mixing together 124.7 grams of the resin of Preparation 1, 98.2 grams of the resin of Preparation 3, 42.6 grams Resimene® 747, 56.8 grams of a methylethyl ketoxime-blocked mixture of hexamethylene diisocyanate and isophorone diisocyanate (75% nonvolatile by weight, available from Bayer Corp.), 3.0 grams of a UVA solution (85% nonvolatile by weight), 47.1 grams of a UVA solution (14% nonvolatile by weight), 4.5 grams of a hindered amine light stabilizer, 0.5 gram of a rheology control agent (60% nonvolatile by weight), 18.0 grams of a blocked sulfonic acid catalyst (25% active by weight), 21.0 grams of n-butanol, and 48.8 grams of Exxate 600 (an oxo-hexyl acetate available from Exxon Chemical Company). The calculated theoretical solids for the composition was 64.5% NV by weight.

The invention has been described in detail with reference to preferred embodiments thereof. It should be understood, however, that variations and modifications can be made within the spirit and scope of the invention.

What is claimed is:

1. A curable coating composition comprising
   (a) a first component comprising at least two functional groups, at least one of which is a carbamate or urea group that is the reaction product of:
      (1) a hydroxyl group that is the result of a ring-opening reaction between an epoxy group and an organic acid group, and
      (2) cyanic acid or a carbamate or urea group;
   (b) a curing agent having a plurality of functional groups that are reactive with component (a), and
   (c) a second component having functional groups that are reactive with component (a) or component (b) or both components (a) and (b).

2. A curable coating composition according to claim 1, wherein the second component (c) comprises a compound having at least active hydrogen, oxazolidine, or epoxide functional group.

3. A curable coating composition according to claim 1, wherein the second component (c) comprises the reaction product of
   (1) a compound comprising a primary carbamate or primary urea group and an active hydrogen group that is reactive with (c) (2), and
   (2) a lactone or a hydroxy carboxylic acid.

4. A curable coating composition according to claim 1, wherein the second component (c) comprises the reaction product of
   (1) a compound comprising a carbamate or urea group or a group that can be converted to a carbamate or urea group, and a hydroxyl functional group that is the reaction product of
      (A) a compound comprising a carbamate or urea group or a group that can be converted to a carbamate or urea group, and an active hydrogen group that is reactive with a lactone or a hydroxy carboxylic acid, and
      (B) a lactone or a hydroxy carboxylic acid, and
   (2) a compound that is reactive with hydroxyl groups on a plurality of molecules of compound (c) (1), but that is not reactive with the carbamate or urea groups on compound (c) (1).

5. A curable coating composition according to claim 1, wherein the second component (c) comprises a compound comprising a plurality of functional crosslinking groups, at least one of which is a carbamate functional group or a urea functional group, which compound also includes at least one carbonate group having the structure:

$$-O-\overset{\overset{\displaystyle O}{\|}}{C}-O-\ .$$

6. A curable coating composition according to claim 1, wherein the second component (c) comprises the reaction product of
   (1) a compound comprising at least one carbamate or urea functional group and at least one hydroxyl functional group that is the reaction product of (A) a compound comprising a carbamate or urea group or a group that can be converted to a carbamate or urea group, and an active hydrogen group that is reactive with a lactone or hydroxy carboxylic acid, and (B) a lactone or hydroxyl carboxylic acid, and (2) a component that is reactive with compound (c) (1) to convert a hydroxyl group on compound (c) (1) to a carbamate group, or a component comprising a group that is reactive with a hydroxyl group on compound (c) (1) and a carbamate or urea group or group that can be converted to carbamate or urea.

7. A curable coating composition according to claim 1, wherein the second component (c) comprises a reaction product of a compound selected from the group consisting of hydroxyethyl carbamate, hydroxypropyl carbamate, hydroxybutyl carbamate, hydroxyethylethylene urea, and mixtures thereof with a hydroxy acid or a lactone.

8. A curable coating composition according to claim 1, wherein the second component (c) comprises a reaction product of a compound selected from the group consisting of hydroxyethyl carbamate, hydroxypropyl carbamate, hydroxybutyl carbamate, and mixtures thereof with ε-caprolactone.

9. A curable coating composition according to claim 4, wherein the compound (2) comprises a member selected from the group consisting of diisocyanates, truisocyanates, and isocyanurates and biurets thereof and mixtures thereof.

10. A curable coating composition according to claim 1, wherein the second component (c) comprises the reaction product of (1) a compound comprising a carbamate or urea group or a group that can be converted to a carbamate or urea group, and a hydroxyl functional group and (2) a compound that is reactive with hydroxyl groups on a plurality of molecules of compound (1), but that is not reactive with the carbamate or urea groups on compound (1).

11. A curable coating composition according to claim 10, wherein the compound (2) comprises a member selected from the group consisting of diisocyanates, triisocyanates, and isocyanurates and biurets thereof and mixtures thereof.

12. A curable coating composition according to claim 1 wherein component (c) comprises a carbamate-functional material that is the reaction product of (1) a first material that is the reaction product of a mixture including
(A) a polyisocyanate and
(B) an active hydrogen-containing chain extension agent with
(2) a compound comprising a group that is reactive with said first material and a carbamate group or group that can be converted to carbamate.

13. A curable coating composition according to claim 1 wherein component (c) comprises an epoxide-functional resin.

14. A curable coating composition according to claim 1 wherein the curing agent (b) is an aminoplast.

15. A curable coating composition according to claim 14 wherein the aminoplast is a melamine formaldehyde resin.

16. A curable coating composition according to claim 1 wherein the component (a) is present at 3–50 weight percent of total resin solids in the coating composition.

17. A curable coating composition according to claim 1 wherein the component (c) comprises a compound having a single carbamate group.

18. A curable coating composition according to claim 1 wherein the component (c) comprises a compound having at least 2 carbamate groups.

19. A curable coating composition according to claim 1 wherein the coating composition is an organic solventborne composition.

20. A curable coating composition according to claim 1 wherein the coating composition is an aqueous dispersion.

21. A curable coating composition according to claim 1 wherein the coating composition is a powder coating composition.

22. A curable coating composition according to claim 1 wherein component (a) comprises a compound represented by either of the structures:

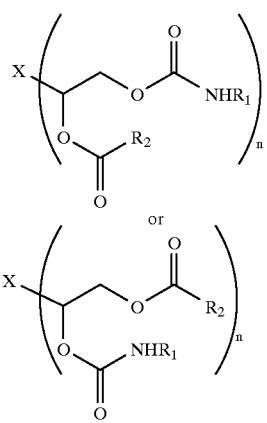

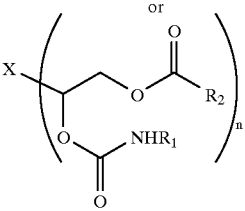

or a combination thereof, wherein
n is a positive integer of at least 1,
$R_1$ represents H, alkyl, or cycloalkyl,
$R_2$ represents alkyl, aryl, or cycloalkyl, and
X represents an organic radical.

23. A curable coating composition according to claim 22 wherein n is 1.

24. A curable coating composition according to claim 22 wherein n is a positive integer of at from 2 to 6.

25. A curable coating composition according to claim 1 having a voc of less than 3.8 lbs/gal.

26. A curable coating composition according to claim 7 having a VOC of less than 3.0 lbs/gal.

27. A curable coating composition according to claim 8 having a VOC of less than 2.0 lbs/gal.

28. A curable coating composition according to claim 9 having a VOC of less than 1.0 lbs/gal.

29. A curable coating composition according to claim 1 wherein said organic acid group is a carboxylic acid group.

30. A cured coating comprising the reaction product of a coating composition according to claim 1.

31. A coating according to claim 30 having a 20° gloss, as defined by ASTM D523-89, of at least 80.

32. A coating according to claim 30 having a DOI, as defined by ASTM E430-91, of at least 80.

33. A composite color-plus-clear coating wherein the clear coating is derived from a coating composition according to claim 1.

34. A curable coating composition according to claim 3, wherein the active hydrogen group is a hydroxyl group and further wherein the component (2) is ε-caprolactone.

35. A curable coating composition according to claim 4, wherein the component (2) is an isocyanurate.

36. A curable coating composition according to claim 35, wherein the isocyanurate is the isocyanurate of isophorone diisocyanate.

37. A curable coating composition according to claim 1, wherein component (c) is a carbamated polyol.

38. A curable coating composition according to claim 1, wherein component (b) comprises a tris(alkoxy carbonylamino) triazine.

39. A curable coating composition according to claim 1, wherein component (c) has oxazolidine functionality.

40. A curable coating composition according to claim 39, wherein component (c) comprises 1-aza-3,7-dioxo-bicyclo-2,8-diisopropyl-5-ethyl(3.3.0)-ocatane.

41. A curable coating composition according to claim 12, wherein the polyisocyanate is isophorone diisocyanate and the chain extension agent is selected from the group consisting of 1,6-hexanediol, cyclohexanedimethylol, 2-ethyl-1,6-hexanediol, Esterdiol 204, 1,4-butanediol, and mixtures thereof.

42. A curable coating composition according to claim 41, wherein the component (2) is selected from hydroxyethyl carbamate, hydroxybutyl carbamate, hydroxypropyl carbamate, and mixtures thereof.

* * * * *